United States Patent [19]

Rapoza et al.

[11] 3,797,145
[45] Mar. 19, 1974

[54] DATA DISPLAY SYSTEM

[75] Inventors: Edward J. Rapoza, Butler; Maxwell E. Siegel, Sussex, both of N.J.; Weems E. Estelle, Southport, Conn.; Pasquale M. Petrucci, Orange, Conn.; Joseph S. Linarducci, Wilton, Conn.; John Hamma, Milford, Conn.; John Montgomery, Trumbull, Conn.

[73] Assignee: Becton, Dickinson and Company, East Rutherford, N.J.

[22] Filed: Aug. 18, 1972

[21] Appl. No.: 281,756

Related U.S. Application Data

[62] Division of Ser. No. 15,469, March 2, 1970, Pat. No. 3,706,499.

[52] U.S. Cl. ................... 40/63 R, 40/104.19, 35/17
[51] Int. Cl. ............................................... G09f 7/02
[58] Field of Search ............ 35/17; 40/63 R, 104.19; 128/2 R; 150/39

[56] References Cited
UNITED STATES PATENTS

| 1,761,877 | 6/1930 | Dawson | 40/104.19 X |
|---|---|---|---|
| 2,226,976 | 12/1940 | Leaming | 40/104.19 |
| 1,952,732 | 3/1934 | Simon | 40/104.19 |
| 3,036,394 | 5/1962 | Johnstone | 40/63 R |

Primary Examiner—Wm. H. Grieb
Attorney, Agent, or Firm—Kane, Dalsimer, Kane, Sullivan and Kurucz

[57] ABSTRACT

A data display system for use with a blood testing system. The blood testing system includes a colorimeter for observing the light transmission characteristics of a reacted blood sample to determine the concentration of a particular component. Part of the blood testing system is a module including a printed scale which is designed to be positioned immediately adjacent the meter needle when the module is operatively connected to the colorimeter. the units of the scale being correlated to the particular blood determination of the module such that the scale reads directly in the units of the test being conducted. A patient record card is provided which is adapted to overlie and be temporarily affixed to the module. The card includes a scale which overlies the scale of the module and is adapted to be marked to serve as a permanent record of the test determination. A removable tear-off tab is associated with the card which may be utilized to identify a blood sample by patient number and test. A number of marked cards, obtained over a period of time for a particular test, is adapted to be placed in overlapping relationship whereby the test results will be displayed as a graph plotted against time. A folder is provided to retain the cards in such overlapping relationship, the folder having a clear plastic overlay with indicia thereon to indicate the normal range of the test results.

3 Claims, 13 Drawing Figures

DATA DISPLAY SYSTEM

This application is a division of application Ser. No. 15,469 filed Mar. 2, 1970, now U.S. Pat. No. 3,706,499, filed Dec. 19, 1972.

BACKGROUND AND SUMMARY OF THE INVENTION

The present invention relates to a system for performing colorimetric analysis of fluid samples. More particularly, the invention relates to a colorimetric system useful in determining the components of a blood sample for diagnostic purposes.

It is well known that quantities of important blood components may be determined by measuring the light transmitted through a properly reacted sample. For each determination, the blood sample is reacted into a complex that will show, by its light transmission characteristics, the concentration of the component of interest. Typical of the tests which may be conducted in this manner are determinations for hemoglobin, glucose, cholesterol, urea nitrogen, uric acid, and bilirubin.

Colorimeters of known design comprise as essential elements a lamp, a sample holding well, a photocell, a meter for indicating the output of the photocell, and the associated circuitry. The intensity of the light passing through the sample is monitored by the photocell, which in turn controls the readout of the meter. Since the optical density of the sample varies with the wave length of the light passing through the sample, it is conventional practice to position a filter in front of the photocell such that the wave length which is most sensitive to changes in the optical density of the sample is being monitored.

In the instrument of the present invention, a removable plug-in module shares some of the above functions with the instrument itself. In particular, the meter scale for the readout meter needle is positioned on the module, and part of the meter circuitry is in the module. By this arrangement, both the scale reading and circuitry of a particular module may be used to calibrate the instrument to the requirements of a specific blood determination. By employing a number of modules, each designed to calibrate the instrument for a different blood test, the instrument may be used to quickly and accurately perform any number of different tests. The circuitry in the module includes an adjustable zero set for the meter, and a calibration adjustment for correcting the calibration of the instrument for inherent variations in the chemistry of the reagents employed. Removing a module from the instrument and replacing it will not upset its calibration.

The instrument of this invention further includes a rotary turntable or carousel for conveniently retaining a number of modules in the instrument. When the carousel is turned to swing a module into its operative or meter position, that module's scale (which may be color-coded to the particular test being conducted) aligns itself in front of the instrument's indicating meter. The scale is graduated and numbered for the one specific determination associated with that module, and it reads directly in appropriate units.

In order to provide a permanent record of the determination results, a paper-like patient record card may be removably attached to the upper surface of the module. The card, which may be color-coded along with its associated module to indicate a particular determination, includes a printed scale corresponding to the scale of the module. The test results may thus be marked directly on the card which, when removed, serves as a permanent record.

The removable patient record card incorporates several novel features which are significant aspects of the present invention. The card initially includes tear-off tabs which, together with the card itself, are adapted to be marked with an identifying patient number. These tabs are then attached to any vessel containing the patient's blood sample, the micro-pipette utilized to transfer the sample in the proper amount and to the cap of the reagent cuvette. As noted above, each card may be color-coded to indicate the particular test for which it is designed. By this arrangement, identification of each blood sample by patient and test is assured.

The patient record card also yields a significant advantage in that it provides a permanent visual record of the test results. In particular, the removable card permits organization of permanent patient records in meaningful graphical displays which aid the physician in his diagnosis. Very often, trends and variations that show up over a period of time mean more than the value of any single blood component determination. If blood tests are made at regular intervals over a period of time, the cards resulting from each test may be arranged in overlaying sequence on a suitable form provided for this purpose. In such arrangement, the marked scales create, virtually, a graph plotted against time with a progression of determination marks which can be scanned at a glance. Thus it is very easy to spot consistencies, sharp variations, or gradual trends. The monitoring form may further include a clear plastic overlay having indicia thereon which are adapted to overlie the marked scales to indicate the normal range of test results.

The use of patient record cards as described herein also permits the assembly of a single graphic display of all the blood chemistry determinations obtained at one time. Presenting all of this information to the physician in a single graphic display may reveal interrelationships which indicate the patient's general physical condition. The use of the removable patient record cards is well suited for this type display since they may be easily mounted in a suitable folder.

The above objects and advantages of the present invention are achieved in the embodiment more particularly described hereinafter. Additional objects and advantages will become apparent to those skilled in the art from the following detailed disclosure.

DESCRIPTION OF THE PREFERRED EMBODIMENT

Figure 1:
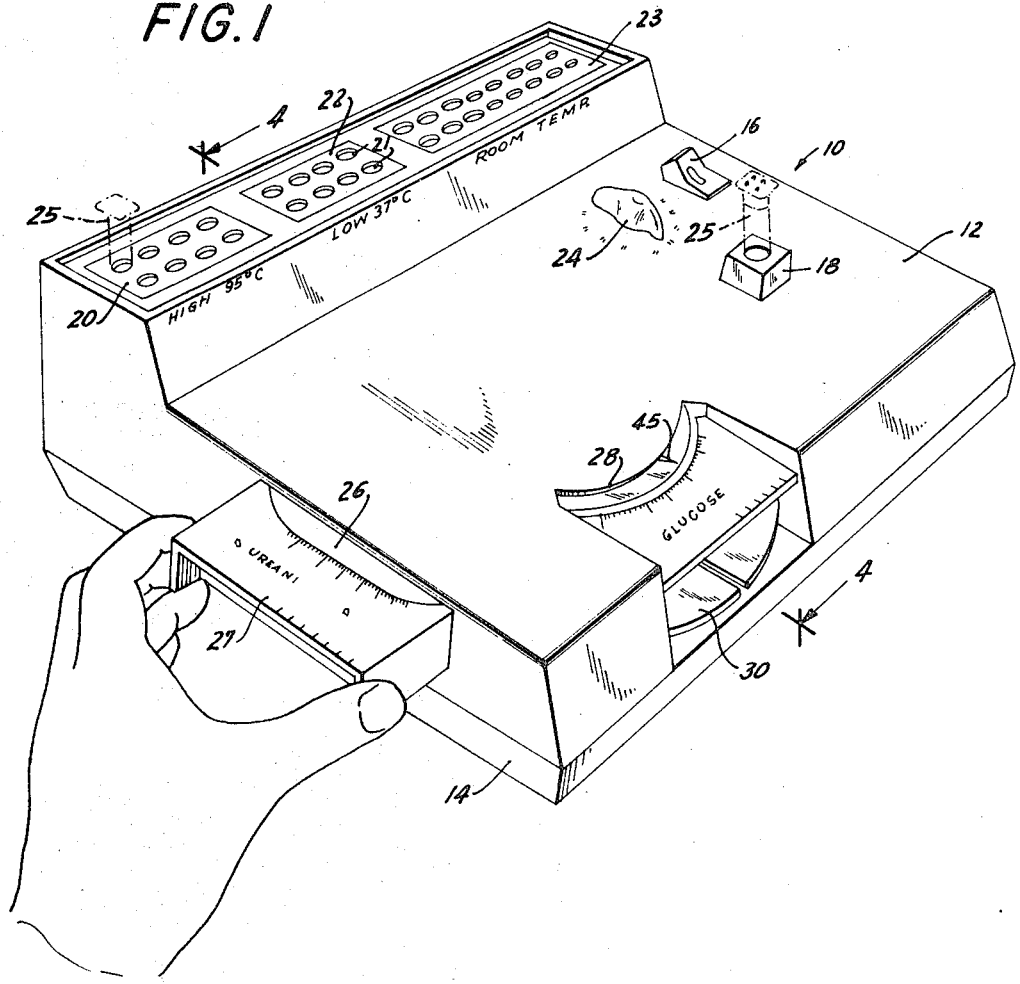
FIG. 1 is a perspective view of the instrument of the present invention illustrating the manner in which the removable modules are assembled on the carousel of the instrument.

The instrument of the present invention is illustrated generally at 10 in the drawings and includes an upper molded plastic cover 12 and a lower molded plastic base 14 which enclose the various components of the device. Viewing FIG. 1, it will be observed that the exterior of the instrument includes an off-on switch 16, a test well guide 18, a 95° C. incubator block 20, a 37° C. incubator block 22, and a room temperature incubator block 23. Each of these incubator blocks includes a number of openings 21 adapted to receive an optically correct reagent vial or cuvette 25. A conventional mechanical timer 24 may be provided as a means for conveniently measuring the reaction times. Any similar timing means such as a conventional electrical timer, may also be effectively utilized. The upper cover 12 of the instrument further includes an entry opening 26 for a removable test module 27, and a meter read-out opening or station 28.

Figure 3:
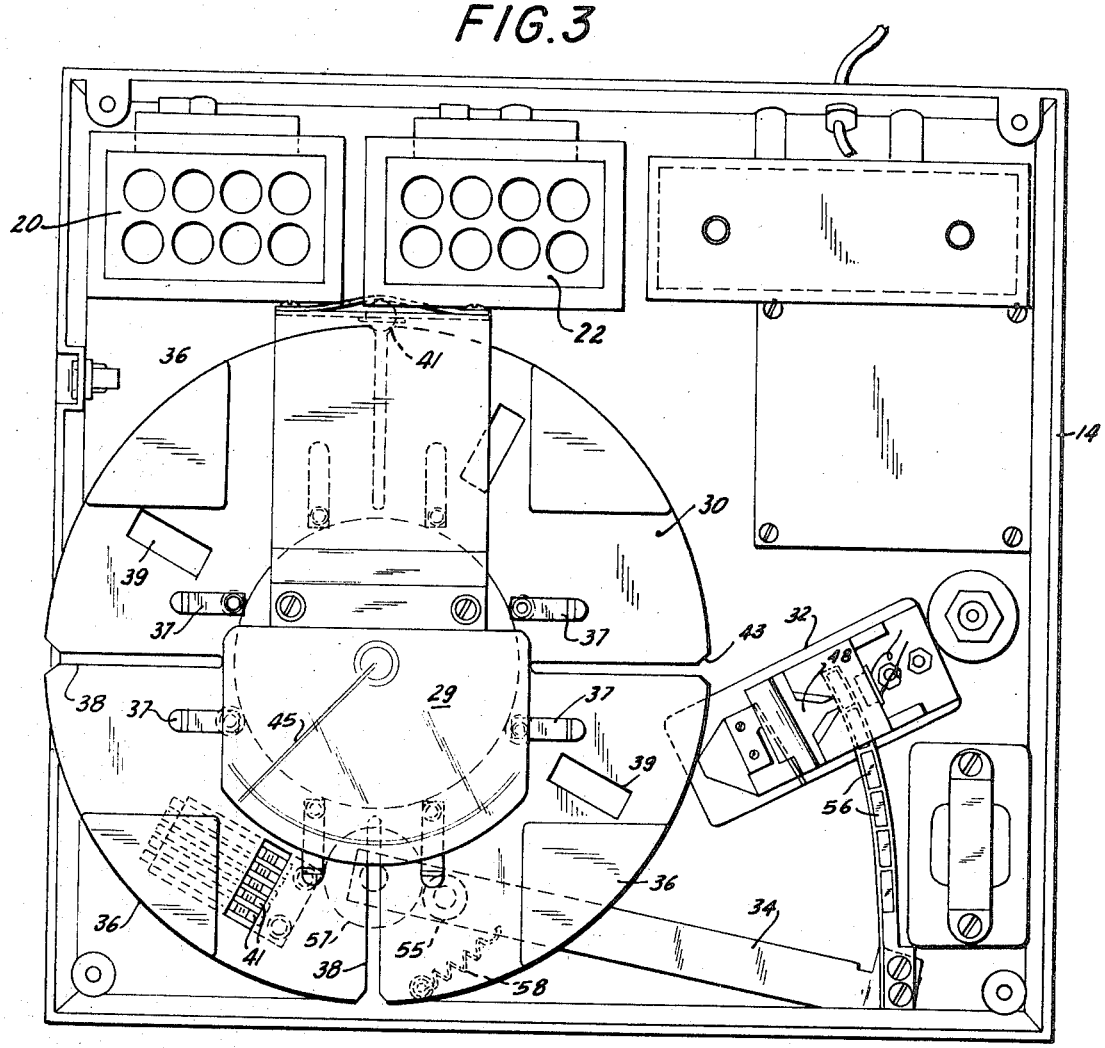
FIG. 3 is an overhead plan view of the instrument, the top cover being removed.

Removal of the upper cover 12 reveals the internal components of the instrument as shown in FIG. 3. These components include as salient features the read-out meter 29, the carousel 30, the photometer 32, and the filter lever arm 34.

Figure 4:
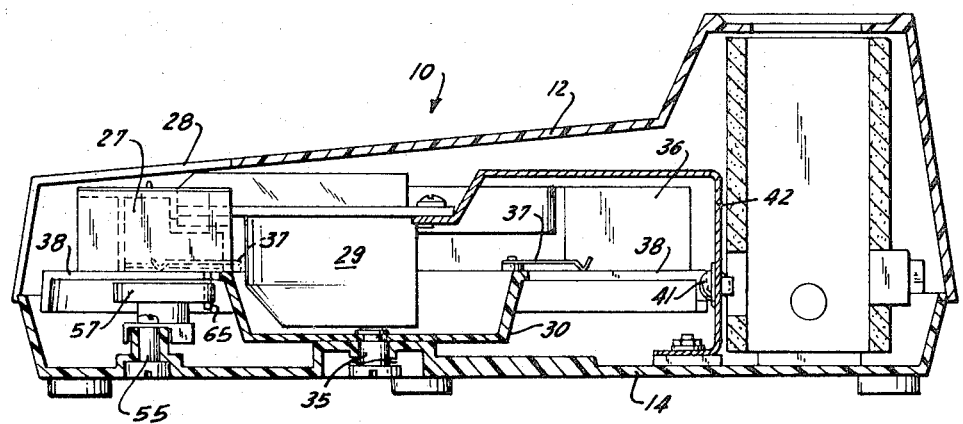
FIG. 4 is a sectional side view taken along the line 4—4 in FIG. 1.

The carousel 30, which may be fabricated from any suitable plastic material, generally comprises a circular disc rotatably supported about a central bearing pin 35 (FIG. 4). The upper peripheral surface of the carousel includes four spaced upstanding lugs 36 defining four radially directed module receiving stations therebetween. For the purposes hereinafter described, each module receiving station incorporates a pair of module retaining clips 37, a radial slot 38 through the body of the carousel, and an opening 39 to expose a number of electrical contacts 40. To prevent inadvertent rotation of the carriage, a ball detent arrangement is provided which includes a ball 41 resiliently mounted in the frame member 42. The ball is adapted to enter a tapered entrance 43 at the end of each slot 38 as each module receiving station comes into alignment with the meter 29.

The meter 29 is a conventional milliammeter, and is supported by the frame member 42 to overlie the central portion of the carousel. The meter includes a read-out needle 45 which is adapted to sweep across the lower module receiving (or read-out) station. It will be noted that the meter 29 does not include an attached printed scale.

The removable test module 27 is illustrated in detail in FIGS. 9–12. The module is fabricated from a suitable plastic material and includes a top cover 60 and a base plate 61. The outer surface of the top cover includes a printed scale 62 positioned along an arcuate edge surface 63, the edge 63 adapted to be positioned immediately below the meter needle 45 when the module is at the read-out position on the carousel. The module further includes a pair of spaced projections 64 on the upper surface, and a depending cam pin 65 on the base plate. Also, the front edge face of the module includes a pair of openings 66, 66' leading to a pair of slots 67, 67' through the base plate 61.

Figure 11:
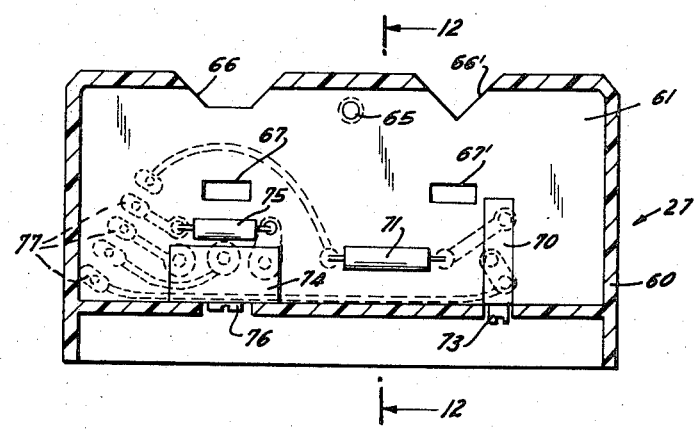
FIG. 11 is a sectional plan view of the module taken along the line 11—11 of FIG. 10.
Figure 12:
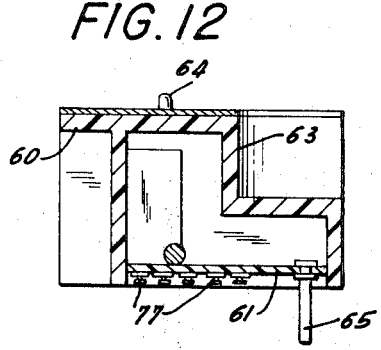
FIG. 12 is a sectional side view of the module taken along the line 12—12 of FIG. 11.
Figure 13:
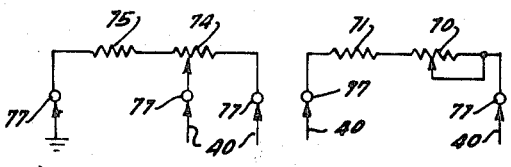
FIG. 13 is a diagram of the circuitry contained in the module.

As mentioned above, the module itself incorporates a portion of the circuitry of the instrument. Referring to FIGS. 11 and 13, the module includes a calibration adjustment including a variable resistor 70 in series with a fixed resistor 71. The resistor 70 is manually adjustable by rotation of the screw 73 which is accessible through the back edge of the module. A zero-set circuit is also positioned in the module and includes a variable resistor 74 in a series with a fixed resistor 75. The resistor 74 includes a screw adjustment or similar type of adjustment means 76. The leads from these two circuits are connected to the terminals 77 which extend through the base plate of the module.

As will be apparent from FIG. 1, each module is positioned on the carousel by sliding it through the opening 26 in the upper cover 12. As this occurs, the clips 37 enter the module through the openings 66, 66' and lock into the slots 67, 66'. Thus the module is firmly retained in its proper position on the carousel.

When the carousel is manually rotated 90° counterclockwise, the module which has entered through opening 26 will arrive at the meter read-out station 28. At this position, the resilient electrical contacts 40 in the instrument pass through the opening 39 in the carousel to engage the terminals 77 of the module. Thus, the calibration and zero-set circuits of the module are connected to the circuit in the instrument. Concurrently with the rotation of the carousel, the pin 65 on the module engages the wheel 57 of the lever arm 34 to rotate the lever arm until the appropriate filter is in position in the photometer. As will be apparent, the exact placement of the pin 65 in the module base plate determines which filter will be positioned in the photometer. By moving the pin closer to the center of the module, a filter closer to the lever arm will be selected.

Figure 2:
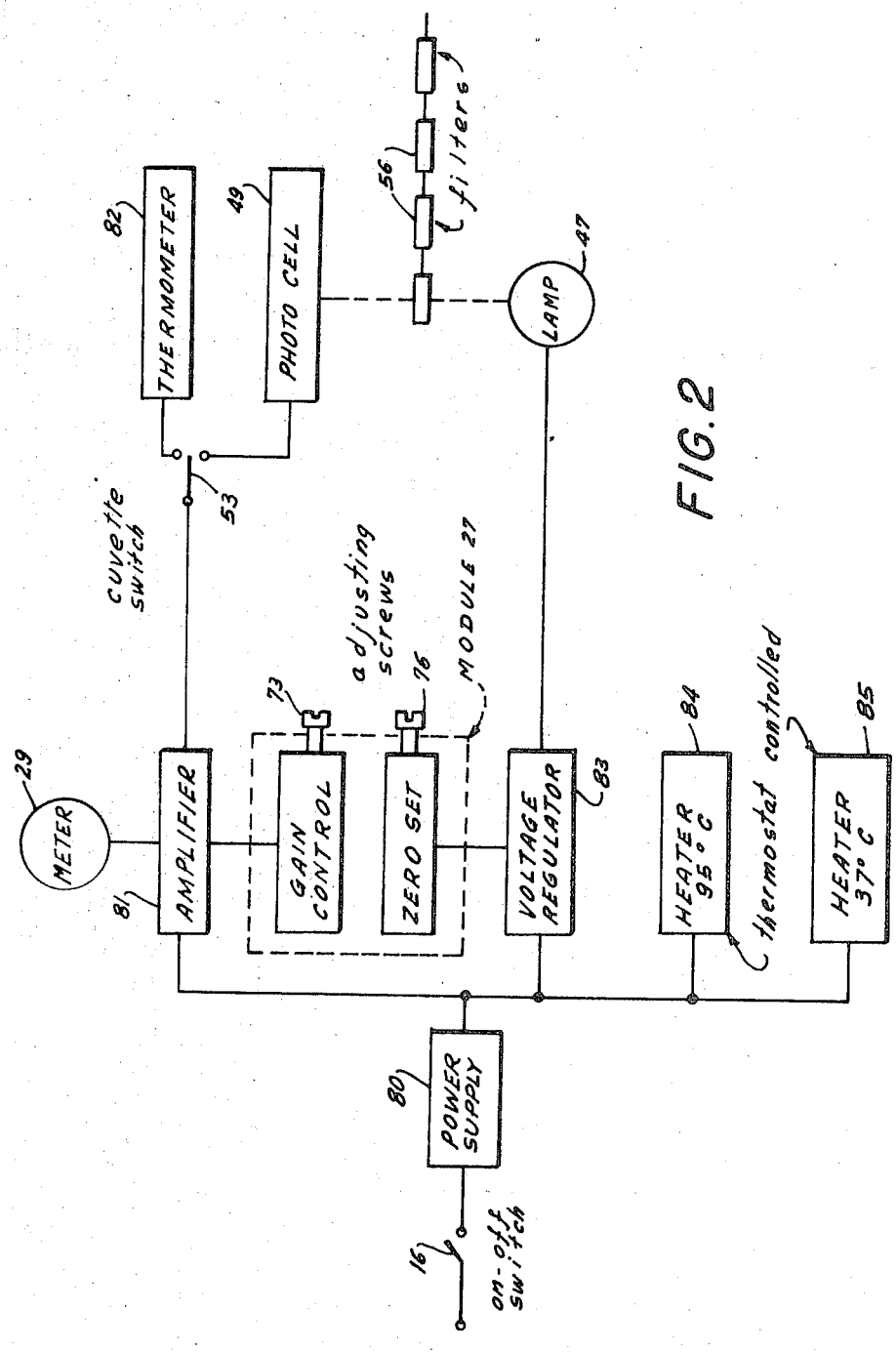
FIG. 2 is a schematic representation of the circuitry employed in the present invention.

The over-all electrical system for the present invention is shown schematically in FIG. 2. It comprises the off-on switch 16 leading from a 110 volt, 60 cycle source to the power supply circuit 80. The power supply circuit feeds the operational amplifier 81, the input of which is controlled by the cuvette actuated switch 53 and is connected to either a thermometer 82 or the photocell 49. As a convenience feature, the thermometer 82 is attached to the 95° C. incubator block. When the thermometer is connected through the switch 53 and amplifier 81 to the meter 29, the meter reading will indicate the temperature of thermometer 82 to thereby serve as a convenient check for the temperature of this incubator. As noted above, the switch 53 is controlled by the entry of the cuvette into the test well, and thus switch-over to the temperature check mode occurs automatically when the cuvette is removed from the well 48. The meter 29 shifts back to determination reading from the photocell 49 as soon as a cuvette is placed in the well.

The power supply circuit 80 also services the voltage regulator 83 which is designed to prevent line fluctuations from varying the intensity of the lamp 47 and thereby degrading determination accuracy. In addition, the power supply circuit feeds the thermostatically controlled heaters 84 and 85 for the two incubators.

As previously mentioned, some of the elements of the circuit are positioned in the removable modules which plug into the instrument. In this regard, the module contains a gain control calibration for the amplifier which serves to scale the meter for the particular test being run. The gain control calibration comprises the resistors 70 and 71 which are connected across the terminals 77 into a feedback loop in the amplifier 81. Also included in the module is the zero set circuit comprising resistors 74 and 75, this circuit establishing the operational point of the voltage regulator and thus serving to control the intensity of light emanating from the lamp 47. Both the calibration and zero set circuits in the module are easily adjusted by rotation of the screws 73 and 76, respectively.

To complete the description of the circuitry shown in FIG. 2 the light emanating from the lamp 47 passes through a filter 56 to the photocell 49. As previously noted, the particular filter employed is automatically selected by the module for the test being conducted. The photocell 49, which serves as the amplifier input when the cuvette is inserted in the test well, measures the intensity of light passing through the sample. The output of the amplifier is calibrated for the particular test being run by the gain control in the module, and thus the meter 29 indicates the test results in appropriate units directly on the module scale 62.

Figures 5, 6:
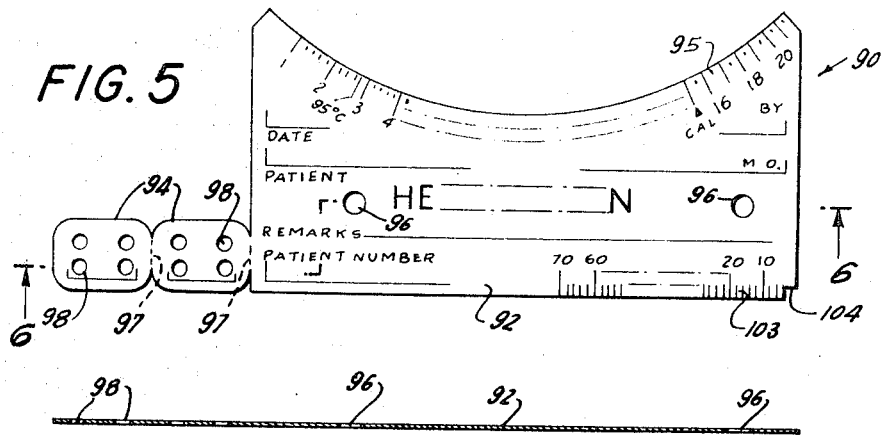
FIG. 5 is a plan view of the patient record element.
FIG. 6 is a side view of the patient record element taken along the line 6—6 of FIG. 5.
Figure 9:
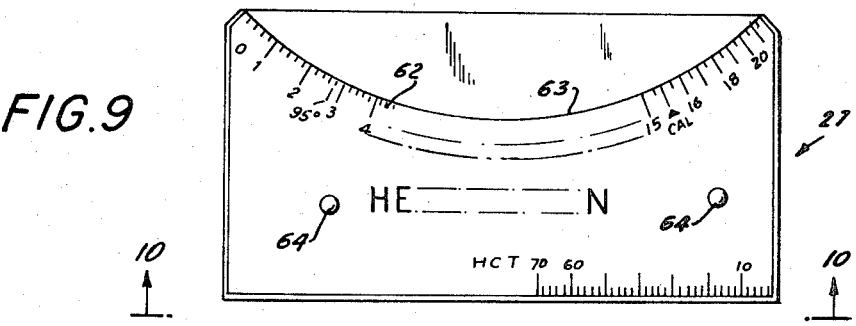
FIG. 9 is a top plan view of the removable module.
Figure 10:
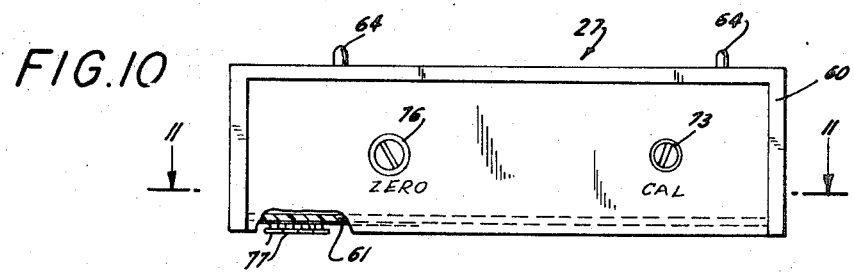
FIG. 10 is a rear elevational view of the module taken along the line 10—10 of FIG. 9.

A further aspect of the present invention resides in the use of a removable patient record element 90 as illustrated in FIGS. 5–6. The element 90 is fabricated from a sheet of paper-like material and includes a data card 92 and two detachable tab portions 94. The data card 92 corresponds in outer configuration to the upper face of the module 27 and includes a scale 95 printed adjacent the arcuate upper edge. The card 92 is adapted to overlie and be retained on the upper face of the module 27, and a pair of apertures 96, which are designed to receive the projections 64, are provided for this purpose. When positioned in this manner, the reading of the meter may be marked directly on the scale 95 to make a permanent record of the determination.

It will be understood that each card 92 is printed with the name of the test for which it is designed (e.g., hemoglobin) and that it is adapted for use only with the corresponding module. In this regard, the entire element 90 may be color-coded to correspond with the color of the appropriate module. Also, the spacing of the projections 64 on the module and the apertures 96 on the card are correlated such that the card for a particular determination will fit only the corresponding module.

The tear-off tabs 94, which may also be color-coded, are connected to the card 92 across the incised lines 97. These tabs are adapted to be marked with the name or number of the patient for identification purposes, and are adapted to be attached to both the micropipette containing the blood sample and also the reagent cuvette. As will be more fully explained below, a number of apertures 98 are positioned in the tabs for this purpose.

It will be noted in FIG. 5 that the scale 95 (as well as scale 62 on the module) includes a reading marked 95° C. As set forth above, the meter 29 will be operatively connected to the thermometer 82 when the cuvette is removed from the test well. Since the thermometer 82 is attached to the 95° C. incubator, this system provides an automatic temperature check of this incubator during intervals between determinations. The 95° C. mark on the scale corresponds to the meter reading indicative of the proper temperature. It will be apparent that a similar temperature check could be provided for the 37° C. incubator. If not, the 37° C. incubator may be checked with a thermometer in a water filled vial which is placed in one of the openings 21. The scales 95 and 62 also include a calibration setting (marked CAL) for the purposes hereinafter set forth.

To maintain patient identification, one of the tabs 94 from the patient record element 90 may be positioned on a capillary tube by threading a micro-pipette through two of the apertures 98.

The patient record element 90 further includes a scale 103 useful in recording the percentage of red blood cells in the sample (i.e., Hematocrit). This procedure is applicable when the original sample is collected from a finger puncture into a capillary tube, capped at one end and then centrifuged. The heavier red cells will be positioned at one end of the capillary tube. Thereafter, by positioning the capillary tube in longitudinal alignment with the scale 103, a mark may be made on the scale at the interface between the plasma and packed red cells. This mark then serves as a record of the Hematocrit. To permit accurate placement of the capillary tube on the scale 103, a cut-out 104 may be provided to receive the cap of the tube.

Figure 7:
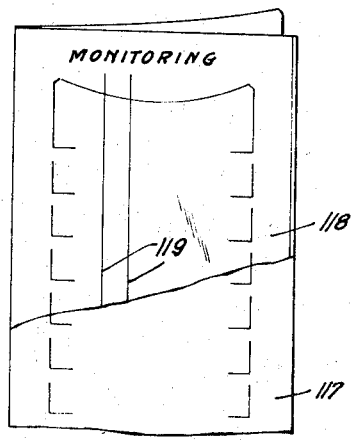
FIG. 7 is a perspective view of the patient monitoring form and its clear plastic overlay.
Figure 8:
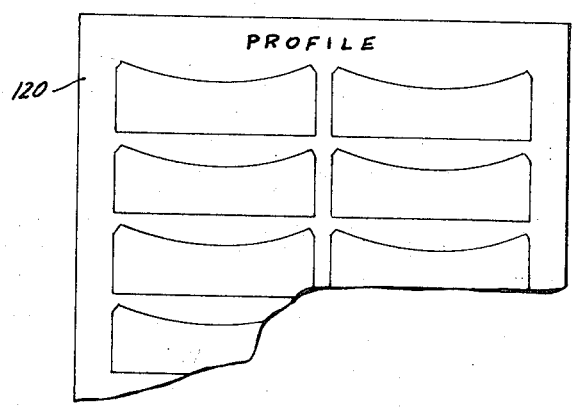
FIG. 8 is a plan view of the patient profile form.

The manner in which the patient record cards may be organized into meaningful graphical displays to aid the physician is illustrated in FIGS. 7 and 8. Very often, trends and variations that show up over a period of time are more meaningful than any single blood component determination. As blood sample tests are made at regular intervals, the patient record cards for the component of interest are filled out and marked. When arranged in overlapping sequence on the monitoring form 117, they create a graph of the determinations plotted against time. The progression of determination marks may be scanned at a glance and it will become easy to spot sharp variations or gradual trends. A clear plastic overlay 118 may be used in conjunction with the monitoring form 117. This overlay, which matches the form, is marked at 119 to show the normal range of the particular blood component for which it is designed. This feature enables the physician to work faster in that it gives him speedy assurance as long as the determinations remain within the normal range.

Often, the interrelationships of the various blood component determinations will be indicative of the patient's general physical condition. Presenting all of this information to the physician in a single graphic display enables him to quicken the professional judgment that he must exercise. For this purpose, a profile record form 120 as illustrated in FIG. 8 may be provided. This form is designed to be a graphic filing place for several patient record cards showing different blood determinations made at one time.

From the preceding description, it will be apparent that the present invention provides a completely self-contained blood testing system which is eminently suitable for achieving the above noted objects. While a specific embodiment of the invention has been described in detail herein, it should be understood that the legal scope of the invention is to be determined by the claims only.

We claim:

1. A data display system for monitoring the concentration of a blood component of a patient over a period of time, said system comprising a plurality of patient record elements, each element comprising a paper-like sheet having a printed and markable scale along one edge surface, said scale being graduated in pre-selected units indicative of the concentration of said blood component, and support means for mounting said patient record elements in overlapping off-set relationship such that the scale of each element is parallel to and immediately below and in alignment with the scale of the underlying element, whereby the aligned scales marked with the blood test determinations cooperate to define a continuous graph plotted against time when said scales are mounted on said support means.

2. The data display system as defined in claim 1 further including a clear plastic overlay adapted to be positioned over said support means in a predetermined relationship, said overlay including indicia to show the normal range of said blood component on the scale of each element.

3. The data display system as defined in claim 3 wherein said element further includes a removable tab portion connected thereto at an incised line, said tab portion including an aperture adapted to facilitate attachment of said tab to a blood container for identification purposes.

* * * * *